United States Patent Office 3,806,525
Patented Apr. 23, 1974

3,806,525
BASIC ANTHRAQUINONE DYE FOR KERATINIC FIBERS AND METHOD OF MAKING SAME
Gregoire Kalopissis, Paris, and Andree Bugaut, Boulogne-sur-Seine, France, assignors to L'Oreal, Paris, France
No Drawing. Original application July 1, 1968, Ser. No. 741,284, now Patent No. 3,576,587. Divided and this application Dec. 1, 1970, Ser. No. 94,173
Claims priority, application Luxembourg, July 5, 1967, 54,036/67
Int. Cl. C09s 1/50
U.S. Cl. 260—380   1 Claim

ABSTRACT OF THE DISCLOSURE

New hair dyeing compound responding to the formula $$\text{anthraquinone with } NH-(CH_2)_n-NH_2 \text{ at position 1 and } OH \text{ at position 4} \tag{I}$$

in which $n$ is a whole number lying between 2 and 6 inclusive.

---

This is a division of application Ser. No. 741,284, filed July 1, 1968 now Pat. No. 3,576,587.

The present invention relates to a new chemical compound responding to the following general formula $$\text{anthraquinone with } NH-(CH_2)_n-NH_2 \text{ at position 1 and } OH \text{ at position 4} \tag{I}$$

in which $n$ is a whole number lying between 2 and 6 inclusive.

In accordance with the invention the compound of Formult I is obtained by brominating 1-N-acetylaminoalkyl-amino anthraquinone responding to the formula:

$$\text{anthraquinone with } NH-(CH_2)_n-NHCOCH_3 \text{ at position 1} \tag{II}$$

in which $n$ has the significance hereinbefore indicated, reacting the resulting product with fuming sulfuric acid in the presence of boric acid so as to replace the bromine atom previously attached at position 4 with a hydroxy radical, and then hydrolyzing the product in an acid medium so as to de-acetylate the chain attached at position 1.

It should be noted that the dyes of Formula I yield especially valuable results when used to dye keratinic fibers, and particularly hair. These dyes are, to a substantial extent, soluble in water, and have a remarkable affinity for keratinic fiber.

Their use in dyeing compositions makes it possible to obtain very intense violet shades with a greater resistance to washing than can be obtained with those anthraquinone dyes having an analogous chemical structure heretofore known, which have a tertiary amine function at the end of the chain attached to position 1 in Formula I.

The present invention relates to a composition for dyeing keratinic fibers, and in particular hair, which is essentially characterized by the fact that it comprises, in aqueous solution, at least one dye responding to Formula I.

In a preferred embodiment of the invention the pH of the dyeing compositions according to the invention lies between 6 and 12, and is preferably about 9.

The concentration of the dyes of Formula I in the dyeing compositions according to the invention may vary within broad limits, but is preferably between 0.01% and 3%.

The dyeing compositions according to the invention may be used at temperatures between 5 and 50° C., but are preferably applied at room temperature.

The dyeing compositions according to the invention may also contain wetting agents, dispersing agents, penetrating agents, perfumes and lacquers, and any other ingredients conventionally included in hair dyeing compositions. They may also contain other dyes than those responding to Formula I, and particularly anthraquinone, azo, and nitro dyes.

The present invention also relates to a method of dyeing keratinic fibers and particularly human hair, essentially characterized by the fact that the hair is impregnated with an aqueous solution containing at least one dye responding to the formula I for from 5 to 30 minutes, after which it is shampooed, rinsed and dried.

In order that the invention may be better understood, a method of preparing a dye responding to Formula I, and several examples illustrating the use of said dye on hair, will now be described, purely by way of illustration.

EXAMPLE 1

Preparation of 1-γ-aminopropylamino-4-hydroxy anthraquinone monohydrochloride

The preparation may be schematically represented in the following form:

$$\text{1-NH-(CH}_2\text{)}_3\text{-NHCOCH}_3 \text{ anthraquinone}$$

$$\downarrow$$

$$\text{1-NH-(CH}_2\text{)}_3\text{-NHCOCH}_3\text{, 4-Br anthraquinone}$$

$$\downarrow$$

$$\text{1-NH-(CH}_2\text{)}_3\text{-NHCOCH}_3\text{, 4-OH anthraquinone}$$

$$\downarrow$$

$$\text{1-NH-(CH}_2\text{)}_3\text{-NH}_2\text{, 4-OH anthraquinone} \cdot HCl$$

First step.—Preparation of 1-γ-acetylaminopropylamino-4-bromo anthraquinone 0.3 mole (9.66 g.) of 1-γ-acetylaminopropylamino anthraquinone is dissolved in 100 cc. of acetic acid at 50° C. 0.03 mole (2.4 g.) of sodium acetate is added, followed by 0.03 mole (4.8 g.) of bromine, which is added little by little, while stirring. The reaction mixture is kept at 50° C. for 7 hours, and then at 20° C. for 15 hours, and then poured into water. The crude product is dried and washed in hot alcohol. The result is 6.3 g. of 1-γ-acetylaminopropylamino-4-bromo anthraquinone which, after recrystallization in methylisobutylketone, melts at 187° C.

Analysis of this product yields the following results:

| Analysis | Calculated for $C_{19}H_{17}N_2O_3Br$ | Found |
|---|---|---|
| C, percent | 56.86 | 56.79–56.89 |
| H, percent | 4.24 | 4.43–4.43 |
| N, percent | 6.98 | 7.10–6.96 |
| Br, percent | 19.95 | 19.54–19.32 |

Second step.—Preparation of 1-γ-acetylaminopropylamino-4-hydroxy anthraquinone 0.0238 mole (9.5 g.) of 1-γ-acetylaminopropylamino-4-bromo anthraquinone is heated for 4 hours at 120° C. in the presence of 95 g. of 10% fuming sulfuric acid and 4.75 g. of boric acid. After cooling, the reaction mixture is poured over cracked ice and neutralized with a sodium hydroxide solution. 10 cc. of acetic anhydride is added and the mixture heated for 30 minutes at 70° C. After cooling, drying and washing with water yields 7.7 g. of 1-γ-acetylaminopropylamino - 4 - hydroxy anthraquinone which, after recrystallization in chlorobenzene, melts at 198° C.

Analysis of this product yields the following results:

| Analysis | Calculated for $C_{19}H_{18}N_2O_4$ | Found |
|---|---|---|
| C, percent | 67.46 | 67.59–67.53 |
| H, percent | 5.32 | 5.49– 5.41 |
| N, percent | 8.28 | 8.15– 8.10 |

Third step.—Preparation of 1-γ-aminopropylamino-4-hydroxy anthraquinone monohydrochloride 0.0133 mole (4.5 g.) of 1-γ-acetylaminopropylamino-4-hydroxy anthraquinone is added to 10 cc. of 50% hydrochloric acid. The mixture is then heated at reflux for two hours and vacuum dried. The residue is redissolved in acetone and drying yields 4.4 g. of 1-γ-aminopropylamino-4-hydroxy anthraquinone monohydrochloride, which, after recrystallization in a mixture of water and isopropanol, melts and decomposes at 269° C.

EXAMPLE 2

The following dyeing composition is prepared:

1-γ-aminopropylamino-4-hydroxy anthraquinone
  mono-hydrochloride _____ 0.33 g.
Lauric alcohol with 10.5 moles of ethylene oxide  2 g.
2N solution of $Na_2CO_3$, q.s.p. _____ pH=7
Water, q.s.p. _____ 100 g.

This composition is applied to bright golden chestnut hair, and left to act for 10 minutes, after which the hair is shampooed and rinsed. A violine chestnut is obtained.

EXAMPLE 3

The following dyeing composition is prepared:

1-γ-aminopropylamino-4-hydroxy anthraquinone
  mono-hydrochloride _____ 0.17 g.
1-N,N-dimethylamino - 3 - β - aminoethylamino-
  4-nitrobenzene _____ 0.11 g.
Lauric alcohol with 10.5 moles of ethylene oxide  3 g.
Monoethanolamine, q.s.p. _____ pH=9
Water, q.s.p. _____ 100 g.

This composition is applied to 90% white hair, and left to act for 15 minutes, the hair is then shampooed and rinsed. A bright burnt chestnut is obtained.

What is claimed is:

1. New anthraquinone dye responding to the formula:

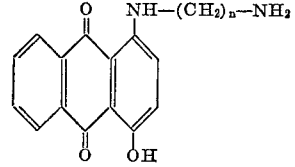

in which $n$ is a whole number lying between 2 and 6 inclusive.

References Cited

UNITED STATES PATENTS 3,123,605    3/1964    Turetzky et al. _____ 260—247.5

OTHER REFERENCES

Houben, Das Anthracen und die Anthrachinone, pp. 308–10, 472 (1929).

LORRAINE A. WEINBERGER, Primary Examiner

R. GERSTL, Assistant Examiner